March 14, 1933.  S. C. OSBORNE  1,901,466
WELDING APPARATUS
Filed Feb. 16, 1931   3 Sheets-Sheet 1
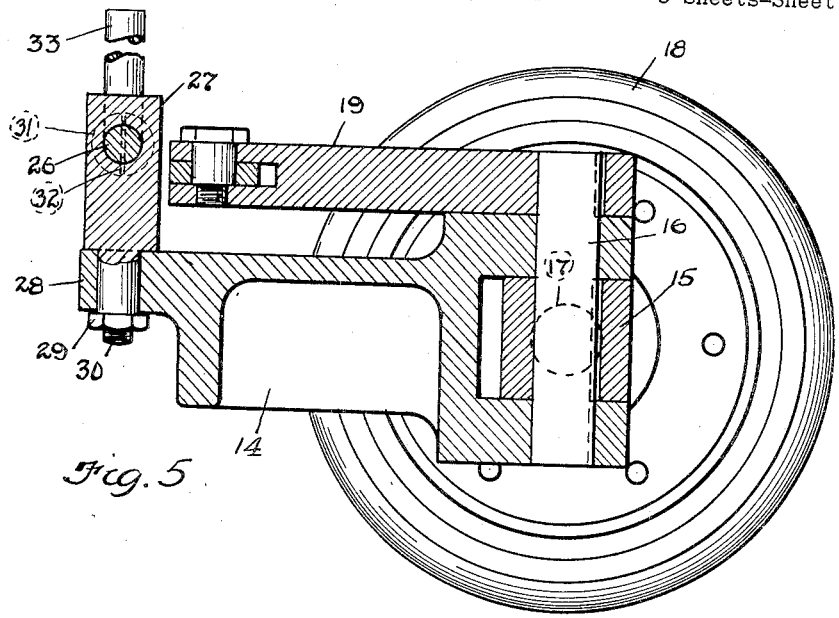
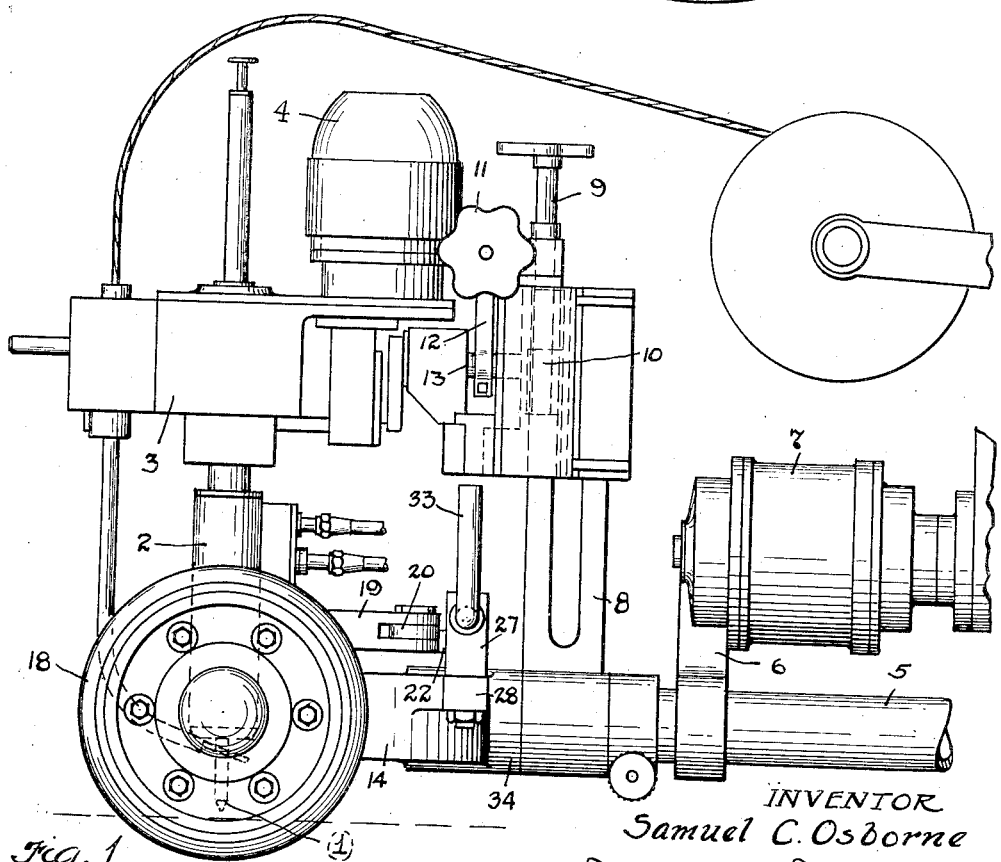
INVENTOR
Samuel C. Osborne
By Fay, Oberlin & Fay ATTORNEYS.

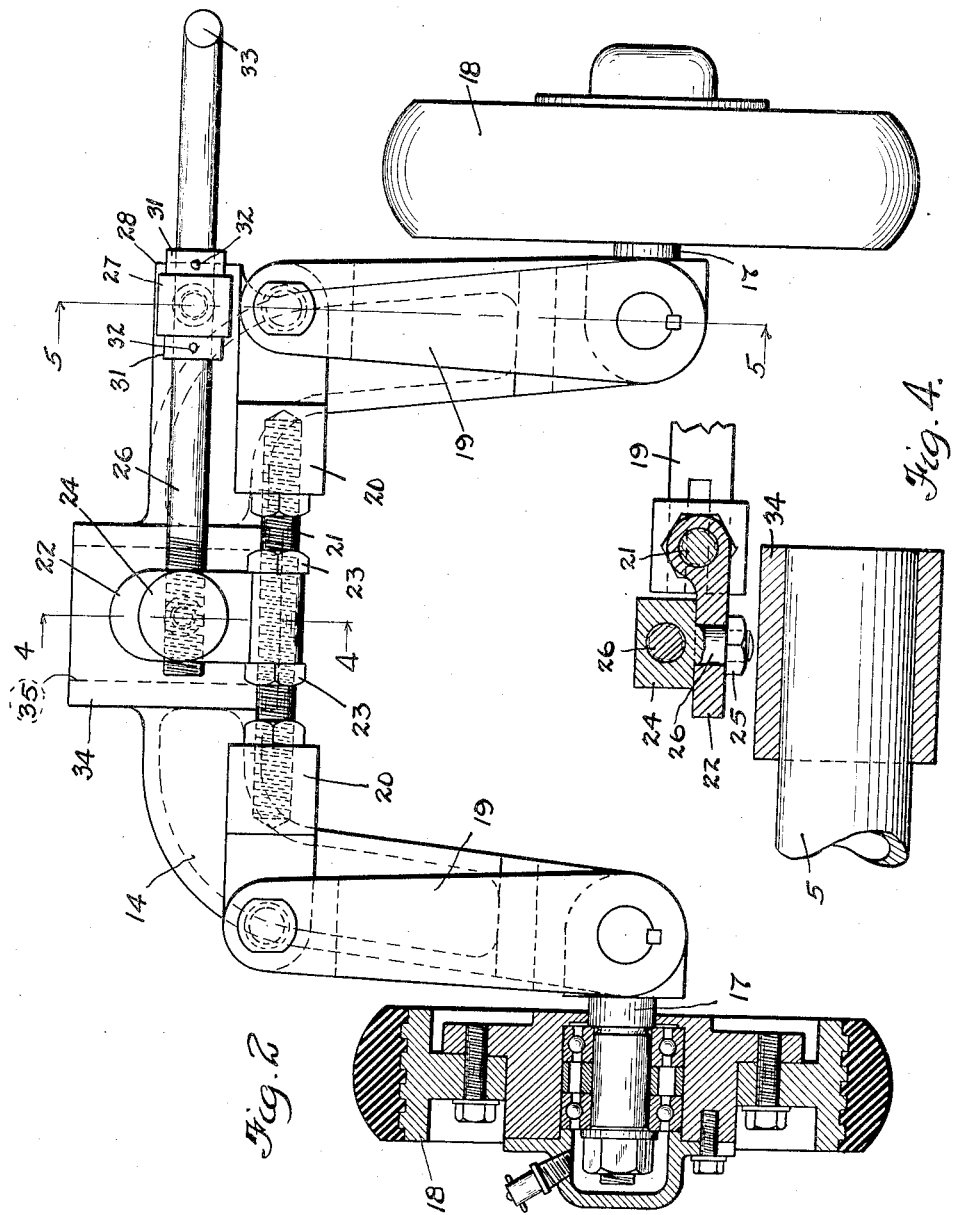

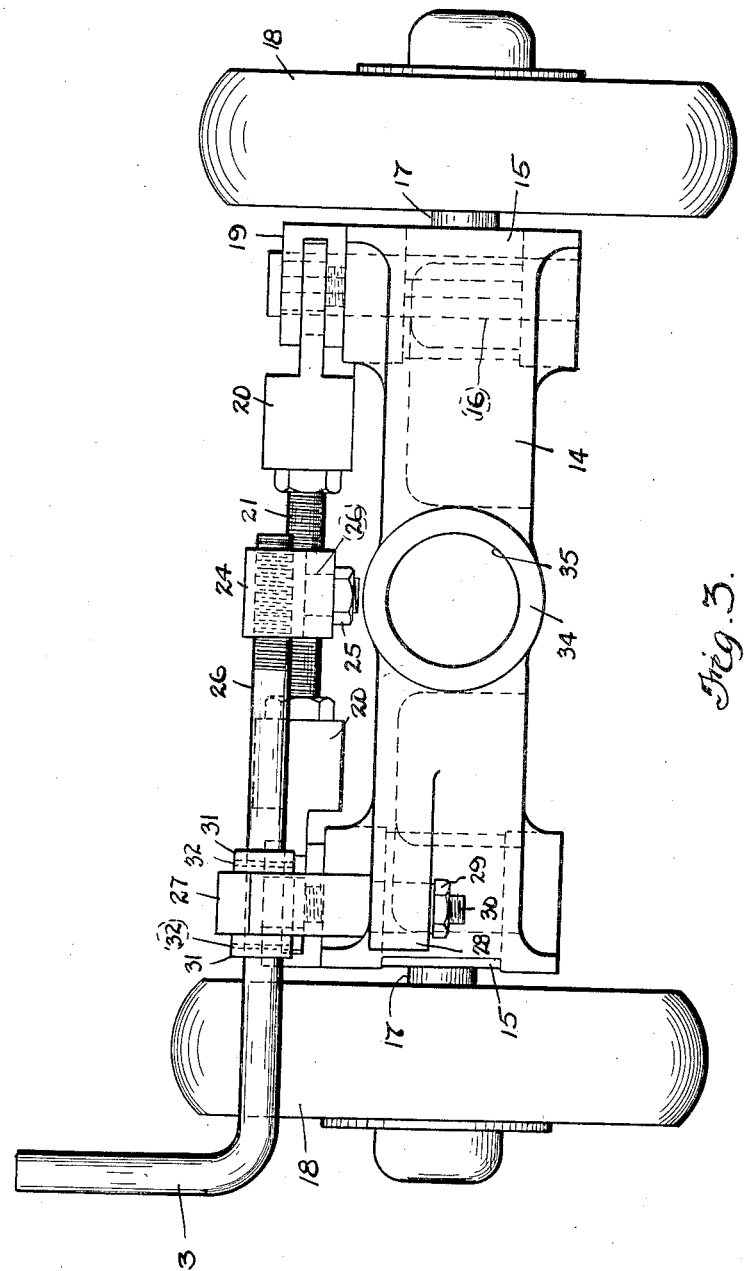

Patented Mar. 14, 1933

1,901,466

UNITED STATES PATENT OFFICE

SAMUEL C. OSBORNE, OF CLEVELAND HEIGHTS, OHIO, ASSIGNOR TO THE LINCOLN ELECTRIC COMPANY, OF CLEVELAND, OHIO, A CORPORATION OF OHIO

WELDING APPARATUS

Application filed February 16, 1931. Serial No. 515,982.

This invention relates to electric welding mechanism and more specifically to welding mechanism of the type adapted to travel upon the work to be welded and is an improvement in the construction illustrated and described in co-pending application Serial No. 409,849, filed November 26, 1929.

In order that the welding electrode as employed in connection with welding mechanism adapted to travel on the work accurately follow the seam cleft to be welded, such electrode should be supported from the carriage and presented in arcing relation to the work intermediately of the means by which the carriage is supported. This is desirable, due to imperfections or waves in the work which, as the wheels of the carriage pass thereover, may cause the electrode to be thrown out of alignment as well as arcing relation with the seam cleft. It is among the objects of this invention to provide a welding mechanism having the above named desirable characteristics. Other objects of the invention will appear as the description proceeds.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Fig. 1 is a fragmentary sectional view of a welding mechanism adapted to travel on the work to be welded and embodying the principles of this invention; Fig. 2 is a plan view partially in section of the axle of the welding carriage as illustrated in Fig. 1; Fig. 3 is an elevational view of the axle and associated parts as shown in Fig. 2; Fig. 4 is a fragmentary sectional view of the axle illustrated in Fig. 2 taken on the plane substantially indicated by the lines 4—4; and Fig. 5 is a sectional view of the axle illustrated in Fig. 2 taken on the plane substantially indicated by the line 5—5.

Referring more specifically to the drawings, and more especially to Fig. 1, the welding mechanism here shown is a portion of that illustrated and described in the above named co-pending application, only so much of the mechanism being here shown as is relative to the improvements comprising this invention. It should be noted that the improvements comprising this invention are applicable to welders other than the type here chosen for the purpose of illustration, the form here shown being briefly described as follows.

The welding electrode 1 is suitably supported in a cooled holder 2 which depends from a differential gear casing 3 which contains the mechanism actuated by a motor 4 for rotating and axially adjusting the electrode with respect to the work. It will be noted that these parts form no part of this invention and a further description thereof is deemed unnecessary. The front and rear axles of the welder, one only of which is shown, are suitably interconnected by a tubular member 5 which serves as a support through the medium of a bracket 6 for a motor 7 which may be utilized to propel the welder carriage over the work. The tubular member 5 also serves as a support for the vertical member 8 on which the differential gear head and its associated mechanism is adjustably mounted. Manual vertical adjustment of the electrode with respect to the work is had by rotation of a screw 9 which engages a slide head 10 causing the head to move vertically with respect to the standard 8. The electrode 1 may be swung in an arc substantially at right angles to the direction of the seam cleft by actuation of an adjusting screw 11, which has a member 12 associated therewith and clamped to the shaft 13 which oscillatably supports the differential gear head 3 and its associated mechanism on the slide head 10.

The axle of the welding carriage adjacent the electrode, which is most clearly shown in Figs. 2 and 3, and which may be considered as the front or rear axle, depending upon the direction of travel of the carriage, has a substantially U-shaped element which is terminally bifurcated, as most clearly shown in Fig. 5, and oscillatably supports at such bifurcated portions a block 15 which is keyed to a shaft 16 and has formed integrally therewith shaft 17. The shafts 17 have mounted thereon in the usual manner wheels 18 by means of which the carriage is supported on the work. Keyed to the vertically disposed shaft 16 are arms 19 which are terminally oscillatably interconnected by means of elements 20 and a screw 21.

The screw 21 threadably engages a knuckle 22 which is locked thereto by means of nuts 23. The knuckle 22 has a knuckle bolt 24 oscillatably secured thereto by means of a nut 25 threadably engaging the terminal portion of a shaft 26 which passes through an aperture formed therefor in the knuckle 22. The knuckle bolt 24 is threadably engaged by the terminal portion of a steering rod 26 which is journaled in the block 27 pivotally mounted on an extension 28 preferably formed integral with the axle element 14. The block 27 is axially restrained with respect to the projection 28 by means of a nut 29 threadably engaging the terminal portion of a shaft 30 formed integrally with the block 27. The steering rod 26 is axially restrained in the block 27 by means of collars 31 which are secured to the rod by taper pins 32. The terminal portion of the steering rod 26 is bent into a handle 33 by means of which such rod may be manually rotated to effect a steering of the wheels through the several elements hereinbefore described.

The axle member 14, which is preferably formed of a one-piece casting, has integrally formed therewith a projection 34 which has an aperture 35 therein adapted to engage the terminal portion of the tubular member 5 by means of which the front and rear axle of the carriage are interconnected.

By employing an axle of the construction described on the electrode end of the welding carriage the electrode 1 may be presented in arcing relation to the work at the intersection of the plane passing through the work contacting points of the supporting wheels and the seam cleft so that as such wheels pass over waves in the work the electrode will follow and not be rocked out of line, as is the case when the electrode is supported from the carriage at a point longitudinally of the seam cleft from the axes of the supporting wheels.

The further advantage and the utility of the form of construction herein described is so apparent to those familiar with the art that a reiteration thereof is believed unnecessary. In connection with this description, only so much of the mechanism as is relative to the improvements comprising this invention have been described and particular reference to common forms of construction have been omitted due to the self-evidence of such construction from an examination of the drawings.

Other modes of applying the principle of by invention may be employed instead of the one explained, change being made as regards the mechanism herein disclosed, provided the means stated by any of the following claims or the equivalent of such stated means be employed.

I therefore particularly point out and distinctly claim as my invention:—

1. In a welding mechanism adapted to run on the work to be welded, a carriage, work engaging wheels supporting one end of said carriage, and means on said carriage adapted to present a welding electrode in arcing relation to the work on the shortest line on the work surface connecting the work areas engaged by said wheels.

2. In a welding mechanism adapted to run on the work to be welded, a carriage, work engaging wheels supporting one end of said carriage, and means on said carriage adapted to present an electrode in arcing relation to the work in a plane normal to the work seam and containing the axis of one of said wheels.

3. In a welding mechanism adapted to run on the work to be welded, a carriage, work engaging wheels supporting one end of said carriage, and means on said carriage adapted to present an electrode in arcing relation to the work on a line from the work area, engaged by one of said wheels, and normal to the work seam.

Signed by me, this 13th day of February, 1931.

SAMUEL C. OSBORNE.